US008645535B1

(12) United States Patent
Martini

(10) Patent No.: US 8,645,535 B1
(45) Date of Patent: Feb. 4, 2014

(54) DETECTING PROFILE CHANGES BASED ON DEVICE BEHAVIOR

(71) Applicant: Phantom Technologies, Inc., San Diego, CA (US)

(72) Inventor: Paul Michael Martini, San Diego, CA (US)

(73) Assignee: Phantom Technologies, Inc., San Diego, CA (US)

( * ) Notice: Subject to any disclaimer, the term of this patent is extended or adjusted under 35 U.S.C. 154(b) by 0 days.

(21) Appl. No.: 13/959,609

(22) Filed: Aug. 5, 2013

(51) Int. Cl.
*G06F 15/173* (2006.01)

(52) U.S. Cl.
USPC ........... 709/224; 709/202; 709/203; 709/220; 709/225

(58) Field of Classification Search
USPC .................................. 709/202, 203, 220, 223
See application file for complete search history.

(56) References Cited

U.S. PATENT DOCUMENTS

| | | | | |
|---|---|---|---|---|
| 8,131,875 | B1 * | 3/2012 | Chen et al. | 709/246 |
| 8,353,050 | B2 * | 1/2013 | Klassen et al. | 726/27 |
| 8,473,743 | B2 * | 6/2013 | Freedman et al. | 713/169 |
| 2013/0159476 | A1 * | 6/2013 | Hilburn et al. | 709/220 |

OTHER PUBLICATIONS

'IBM', [online] "IBM InfoSphere Master Data Management," [retrieved on Jun. 1, 2013]. Retrieved from the Internet: URL: http://pic.dhe.ibm.com/infocenter/mdm/v10r0m0/index.jsp, 1 page.
Pelino, "Benchmarking Your Enterprise Mobile Device Operations Initiatives and Plans," *Forrester; FOR Security & Risk Professionals*, Oct. 2012, 15 pages.
Rubens, "Mobile Device Management (MDM) Platform Buying Guide," *Enterprise Networking Planet*, Aug. 2012, 4 pages www.enterprisenetworkplanet.com/netsecur/mobile-device-management-mdm-buying-guide-1.html.
Sasaoo, "iOS 6 offers improved mobile device management,", *Computer Games*, Apr. 2013, 2 pages http://computergames.sasaoo.com/2013/04/ios-6-offers-improved-mobile-device-mangement/.

* cited by examiner

*Primary Examiner* — Michael Y Won
(74) *Attorney, Agent, or Firm* — Fish & Richardson P.C.

(57) ABSTRACT

Methods and systems for detecting profile changes based on device behavior. One example method includes assigning a network configuration to a device associated with a network, applying a mobile device management (MDM) profile to the device, the MDM profile including settings configuring the device according to the network configuration, monitoring network activity of the device to detect one or more actions by the device that are prohibited by the network configuration, determining that the MDM profile has been altered based at least in part on the detection of one or more actions prohibited by the network configuration, and performing a remediation action associated with the device based on the determination that the MDM profile has been altered.

20 Claims, 4 Drawing Sheets

DETECTING PROFILE CHANGES BASED ON DEVICE BEHAVIOR

BACKGROUND

This specification generally relates to detecting profile changes based on device behavior.

In corporate and other networks, devices on a network may be managed by a mobile device management (MDM) platform. The MDM platform may apply profiles, which may include various network settings, to various devices on the network. In some cases, the network settings specified by a profile may include one or more policies governing how the device accesses the network, proxy server configuration settings governing how the device accesses external networks, and/or other local network configuration settings for the particular device.

SUMMARY

In general, one aspect of the subject matter described in this specification may be embodied in systems and methods performed by data processing apparatuses that include the actions of assigning a network configuration to a device associated with a network, applying a mobile device management (MDM) profile to the device, the MDM profile including settings configuring the device according to the network configuration, monitoring network activity of the device to detect one or more actions by the device that are prohibited by the network configuration, determining that the MDM profile has been altered based at least in part on the detection of one or more actions prohibited by the network configuration, and performing a remediation action associated with the device based on the determination that the MDM profile has been altered.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
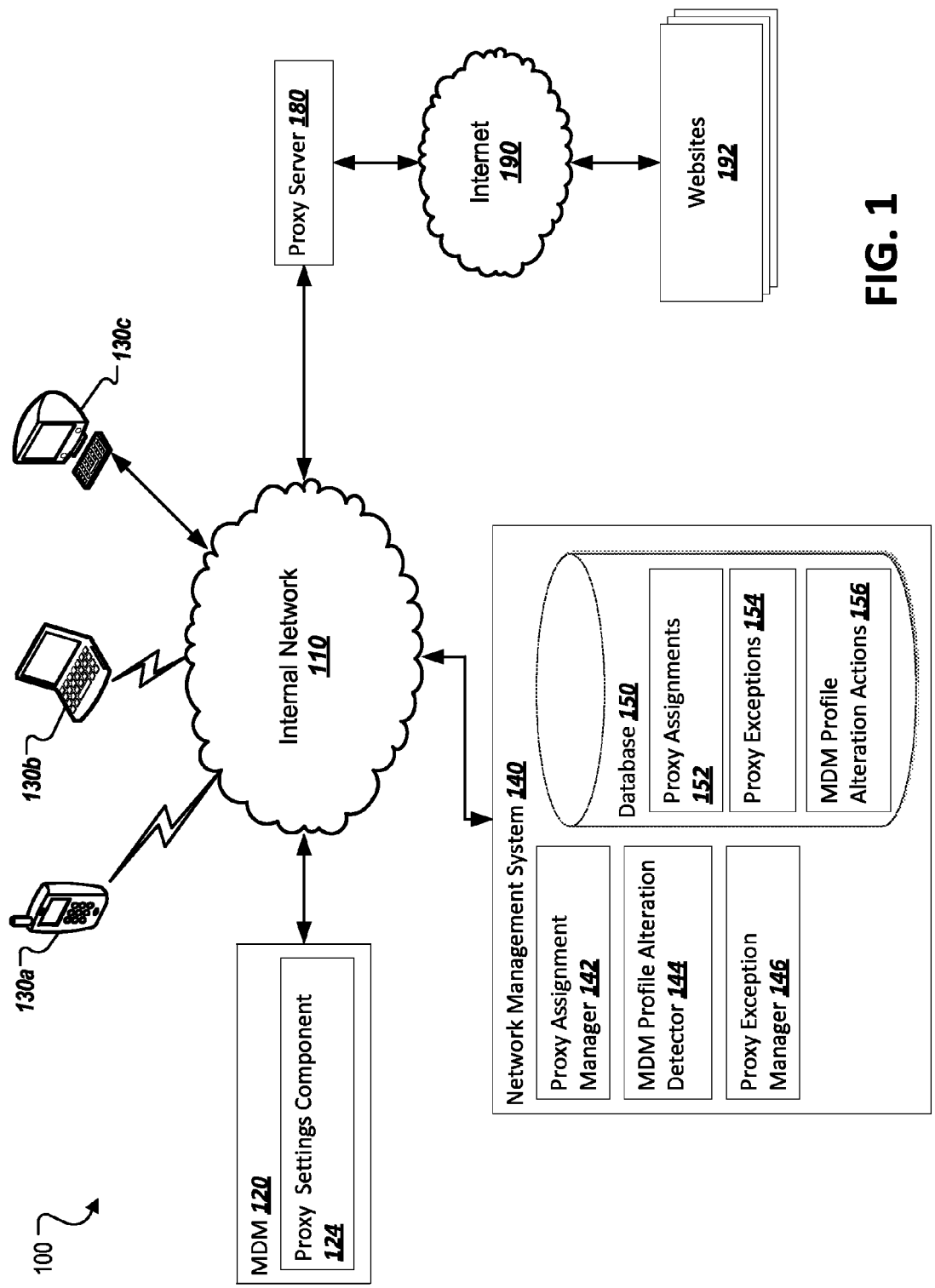
FIG. 1 is a diagram of an example environment.

A proxy server often is used by a network owner or administrator to control access to an external network, such as the Internet, by users of an internal network, such as a Local Area Network (LAN). A proxy server may also save Internet bandwidth and provide security by filtering users' access to objectionable or dangerous Internet sites. In some implementations, the proxy server configuration of devices on a network, including which proxy server or servers a particular device should use, is applied by an MDM platform as part of a device profile including network configuration settings.

With the recent proliferation of mobile devices, many network owners have adopted a Bring Your Own Device (BYOD) approach in which users can access internal networks using personal devices (e.g., as opposed to devices issued by the enterprise that controls the network). In such BYOD-friendly networks, network owners may desire to require that each device seeking access to the network maintain and use a local device profile in order to enforce certain network usage policies and the like. However, it may be difficult for a network owner to ensure that the user of the device has not modified or deleted the device profile in order to circumvent the network policies the network owner is attempting to enforce. For example, a device user may delete a device profile in order to access the Internet directly rather than through a proxy server, thereby circumventing security or filtering procedures for Internet traffic provided by the network's proxy server. Accordingly, the present disclosure describes systems and methods for detecting, based on device behavior, when a device profile has been modified or deleted. In some cases, proxy server assignments for each device on the network are used to detect device behavior indicating a modified or deleted device profile.

In some implementations, a network configuration is assigned to a device associated with a network. The network configuration may include a proxy server assignment instructing the device to use a particular proxy server or set of proxy servers to access the Internet. The network configuration may be applied to the device as part of an MDM profile stored and maintained locally on the device. Network activity of the device is then monitored to detect actions by the device that are prohibited by the network configuration. For example, if a device is configured to access the Internet only through a certain proxy server, but attempts to send a request directly to a particular web site, this may be detected as a prohibited action. A determination may then be made that the MDM profile on the device has been altered (e.g., changed, deleted, etc.) based at least in part on the detection of actions prohibited by the network configuration. An action may then be performed associated with the device based on the determination that the MDM profile has been altered. For example, the device may be blocked from accessing the network based on the determination.

The foregoing approach has several potential advantages. Increased security may be provided by ensuring that security settings applied by the network owner to devices on the network remain in place. The present approach also is less intrusive than other approaches, such as installing additional software on the device to detect profile alterations, and thus is simpler and easier for network owners to implement. In addition, the present approach utilizes existing technologies and systems (e.g., MDM), and thus may be less costly for a network owner to implement as these systems may already be installed on the network.

FIG. 1 is a diagram of an example environment 100. The example environment 100 includes an internal network 110 connecting a mobile device manager (MDM) 120, one or more devices 130*a-c*, and a network monitoring system 140. A proxy server 180 is connected to the internal network 110 into the Internet 190. One or more websites 192 are connected to the Internet 190.

In operation, the network monitoring system 140 may be operable to identify and manage proxy assignment information associated with the one or more devices 130*a-c* connected to the internal network 110. Network monitoring system 140 may provide the MDM 120 with proxy settings associated with the one or more devices 130a-c. In some implementations, the network management system 140 may retrieve these proxy settings from the MDM 120, and store them in the database 150. The MDM 120 may apply the proxy settings to the one or more devices 130a-c. For example, the proxy settings may specify that device 130a should access proxy server 180 in order to access resources connected to the Internet 190, such as websites 192. The network monitoring system 140 monitors traffic on the internal network 110 and observes the behavior of the one or more devices 130a-c. If one of the one or more devices 130a-c behaves in a way that is inconsistent with its associated proxy assignment, the network monitoring system 140 may determine that the proxy settings on the device have been altered, such as by removing an MDM profile containing the proxy settings. In such a case, the network monitoring system 140 may perform a configured action on the device, such as, for example, blocking the device from accessing the network, notifying an administrator that the device's proxy settings have been altered or removed, and/or sending an indication to the device indicating that the alteration has been detected.

For example, if the device 130a is assigned to proxy server 180, and the network monitoring system 140 detects that the device 130a has sent a request directly to one of the websites 192, the network monitoring system 140 may determine that the proxy settings on device 130a have been altered, and perform the configured action.

As shown, the example environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Such a configuration is often referred to as a Bring Your Own Device (BYOD) network in which users are free to use their own personal devices for connecting to the network. In some implementations, the entity that controls the internal network 110 may issue devices to users for use on the internal network 110. The internal network 110 may also be a wired network, such as an Ethernet network.

One or more devices 130a-c are connected to the internal network 110. In some implementations, the one or more devices 130a-c include mobile devices, such as cellular telephones (e.g., 130a), smartphones, tablets, laptops (e.g., 130c) and other similar computing devices. The one or more devices 130a-c may also include wired devices, such as desktop computer 130b. In some implementations, the one or more devices 130a-c include personal devices associated with one or more users. The one or more devices 130a-c may also include devices issued or owned by the entity that provides the internal network 110, such as company-issued smartphones or laptops. In some implementations, the one or more devices 130a-c may run network access or web browsing software (e.g., a web browser) for accessing resources on the Internet 190.

In the illustrated implementation, a proxy server 180 is connected to the internal network 110. As shown, the environment 100 also includes a proxy server 180 connected to the internal network 110 and the Internet 190. In some implementations, the proxy server 180 search is a gateway to a wide-area network (WAN), such as the Internet 190, for the one or more devices 130a-c. Requests made by the devices may be first passed to the proxy server 180, which will then pass the request on to the Internet 190. In some implementations, the proxy server 180 may perform filtering on these requests, such as blocking access to resources on the Internet 190 that are known to include objectionable or otherwise prohibited content. Proxy server 180 may perform this filtering by analyzing requests sent by the one or more devices 130a-c, identifying requests for Uniform Resource Locators (URLs) of known prohibited sites, and returning a response to the sending device indicating that the request will not be fulfilled.

As shown, the proxy server 180 is connected to the Internet 190. In some implementations, the Internet 190 is the public Internet. The Internet 190 may also be any network or combination of networks accessed from the internal network 110 via the proxy server 180. In such an implementation, the Internet 190 may be public, private, or a combination of the two. In some implementations, the Internet 190 is a distributed network utilizing the Transmission Control Protocol (TCP) in combination with HTTP to transmit requests for pages to web servers connected to the Internet 190, and to transmit responses from the web servers to the requesting clients.

One or more websites 192 are connected to the Internet 190. In some implementations, the one or more websites 192 are destinations associated with network addresses, such as Uniform Resource Locators (URLs), that are accessible from the internal network 110, such as via the proxy server 180. In some cases, the websites 192 may be accessible over the Internet 190 using the Hypertext Transfer Protocol (HTTP). The websites 192 may also be resources accessible over the Internet 190 using any suitable protocol or combinations of protocols, including, but not limited to, Session Initiation Protocol (SIP), File Transfer Protocol (FTP), Simple Object Access Protocol (SOAP), Secure Shell (SSH), Secure Copy (SCP), or any other suitable protocol.

The example environment 100 also includes an MDM 120 connected to the internal network 110. In some implementations, the MDM 120 is configured to provide network settings to the one or more devices 130a-c. Network settings may include device-specific credentials, proxy settings, or any other suitable settings associated with the one or more devices 130a-c. In some implementations, the MDM 120 allows an administrator to configure profiles including the various settings described above, and assign the one or more devices 130a-c to these profiles. A device assigned to a profile may be assigned the settings associated with the profile. In this way, common settings may be applied to multiple devices at once without having to enter the common settings for each device individually.

In some implementations, the MDM 120 may be a server or set of servers located on the internal network 110 and accessible by the one or more devices 130a-c. The MDM 120 may be operable to push network settings to the one or more devices 130a-c at various times such as, for example, according to a regular update schedule, when triggered by an administrator, when requested by a device, and/or any other appropriate time.

As shown, the MDM 120 includes a proxy settings component 124. In operation, the proxy settings component may manage proxy settings associated with the one or more devices 130a-c. The proxy settings may include a network address for the proxy server associated with the device, a proxy auto configuration script associated with the device, rules associated with how the device should use the proxy, or any other suitable proxy settings. In some implementations, the proxy settings component 124 may include proxy settings within an MDM profile associated with each of the one or more devices 130a-c. The MDM profile may be pushed to each of the devices 130a-c by the MDM 120.

In some implementations, the proxy settings component 124 may access a configuration resource storing proxy settings for the one or more devices 130a-c. In some cases, the configuration resource may be stored on the MDM 120. The configuration resource may also be stored on the network monitoring system 140, such as in the database 150.

The example environment 100 also includes a network monitoring system 140. In some implementations, the network monitoring system 140 is a server connected to the internal network 110 that acts as a gateway between the internal network 110 and the Internet 190. In such a configuration, all network traffic to and from the one or more devices 130a-c and the Internet 190 passes through the network monitoring system 140. The network monitoring system 140 may function as a proxy server in such a configuration. The network monitoring system 140 may also analyze data being sent to and from the one or more devices 130a-c.

The network monitoring system 140 may also be arranged in a tap or span configuration, such that data from the internal network 110 does not flow through it, but instead, the network monitoring system 140 monitors the data passively, such as by receiving notifications from another component of data transfers and other network activities.

As shown, the network monitoring system 140 includes a proxy assignment manager 142. In operation, the proxy assignment manager 142 may be operable to receive, manage, generate, or identify proxy assignments associated with the one or more devices 130a-c. In some implementations, the proxy assignment manager 142 may receive the proxy assignments from an administrator, such as via a management tool, and may store the proxy assignments in the database 150 as proxy assignments 152. The proxy assignment manager may also generate the proxy assignments 152 automatically for the one or more devices 130a-c.

In some implementations, the proxy assignment manager may manage the proxy assignments 152, which may include mappings of each of the one or more devices 130a-c to a proxy server or set of proxy servers. For example, the proxy assignments 152 may specify that device 130a is assigned to proxy server 180. The proxy assignment manager 142 may identify this proxy assignment to cause the appropriate settings to be applied to the device 130a. In some implementations, the proxy assignment manager may interact with the MDM 120 to specify the proxy assignments for the one or more devices 130a-c. In some cases, the MDM 120 may request proxy settings for the one or more devices 130a-c from the proxy assignment manager 142. In such a case, the proxy assignment manager 142 may query the database 150 for the proxy assignments 152, and respond to the MDM 120 with the appropriate proxy assignments.

The network monitoring system 140 also includes an MDM profile alteration detector 144. In operation, the MDM profile alteration detector 144 may monitor traffic on the internal network 110 and compare the traffic with the proxy assignments 152. If the MDM profile alteration detector 144 detects network traffic for one of the one or more devices 130a-c that violates the proxy assignments 152, the MDM profile alteration detector 144 may determine that the MDM profile associated with the device has been altered, and may perform one of the configured MDM profile alteration actions 156 in response. For example, if the MDM profile alteration detector 144 detects that device 130a has accessed one of the one or more websites 192 directly, and the device 130a is configured to only access the Internet 190 via the proxy server 180, the MDM profile alteration detector 144 may block future access to the network 110 by the device 130a.

The network monitoring system 140 also includes a proxy exception manager 146. In operation, the proxy exception manager 146 may be operable to manage exceptions to the proxy assignments indicating cases in which the one or more devices 130a-c will not use an assigned proxy server. The proxy exception manager 146 may access the proxy exceptions 154 in the database 150 in making these determinations. For example, if the device 130a is configured to use the proxy server 180, and a proxy exception 154 is configured such that the device 130a can access website 192 directly, the proxy exception manager 146 would detect and allow such traffic. In some implementations, the MDM profile alteration detector 144 may consult the proxy exception manager 146 to determine whether an apparent violation of a proxy assignment 152 by one of the devices 130a-c is permitted by the proxy exceptions 154.

As shown, the network monitoring system 140 includes a database 150. In some implementations, the database 150 may be stored on the same server as the network monitoring system 140. The database 150 may also be stored on a separate server and accessed by the network monitoring system 140 over a network. The database 150 may be any proprietary or commercially available database system or format, including, but not limited to, MySQL®, Microsoft® SQLServer, IBM® DB2, Oracle®, SQLite, or any other suitable database system or format. The database 150 may also be a distributed database running on a plurality of servers. In some implementations, the database 150 may be a configuration file or set of configuration files associated with the network monitoring system 140. The network monitoring system 140 may examine these configuration files to determine the currently configured application profiles and associated rules.

The database 150 includes proxy assignments 152. In some cases, the proxy assignments 152 map one of the one or more devices 130a-c to a proxy server or set of proxy servers. The proxy assignments 152 may be stored in a table or set of tables within the database 150, and may include additional information associated with the assignment, such as a time when the assignment should take effect, a network address for the assigned proxy server, a port for the assigned proxy server, or any other suitable information. In some implementations, each of the one or more devices 130a-c may be assigned a unique network address and port combination on a proxy server. In some cases, the proxy assignments 152 may be accessible by the proxy server 180, such that the proxy server 180 may notify the network monitoring system 140 when it detects one of the one or more devices 130a-c behaving contrary to its proxy assignment.

The database 150 also includes proxy exceptions 154. In some cases, the proxy exceptions 154 may include rules stating circumstances in which the one or more devices 130a-c may violate their associated proxy assignments 152. For example, the proxy exceptions 154 may specify that device 130a is allowed to access the website "www.home.com" directly without going through its assigned proxy server 180. In some implementations, proxy exceptions 154 may be used to configure destinations controlled by the same entity as the internal network 110 to be accessible directly by the devices 130a-c.

In the illustrated implementation, the database 150 also includes MDM profile alteration actions 156. In some cases, the MDM profile alteration actions 156 specify actions to be applied to a device that is detected behaving contrary to its associated proxy assignment. The MDM profile alteration actions 156 may include, but are not limited to, blocking access of the device to the internal network 110, restoring an MDM profile to the device, notifying an administrator, notifying the device that alteration of its MDM profile has been detected, applying a restricted MDM profile to the device, or any other suitable actions.

Figure 2:
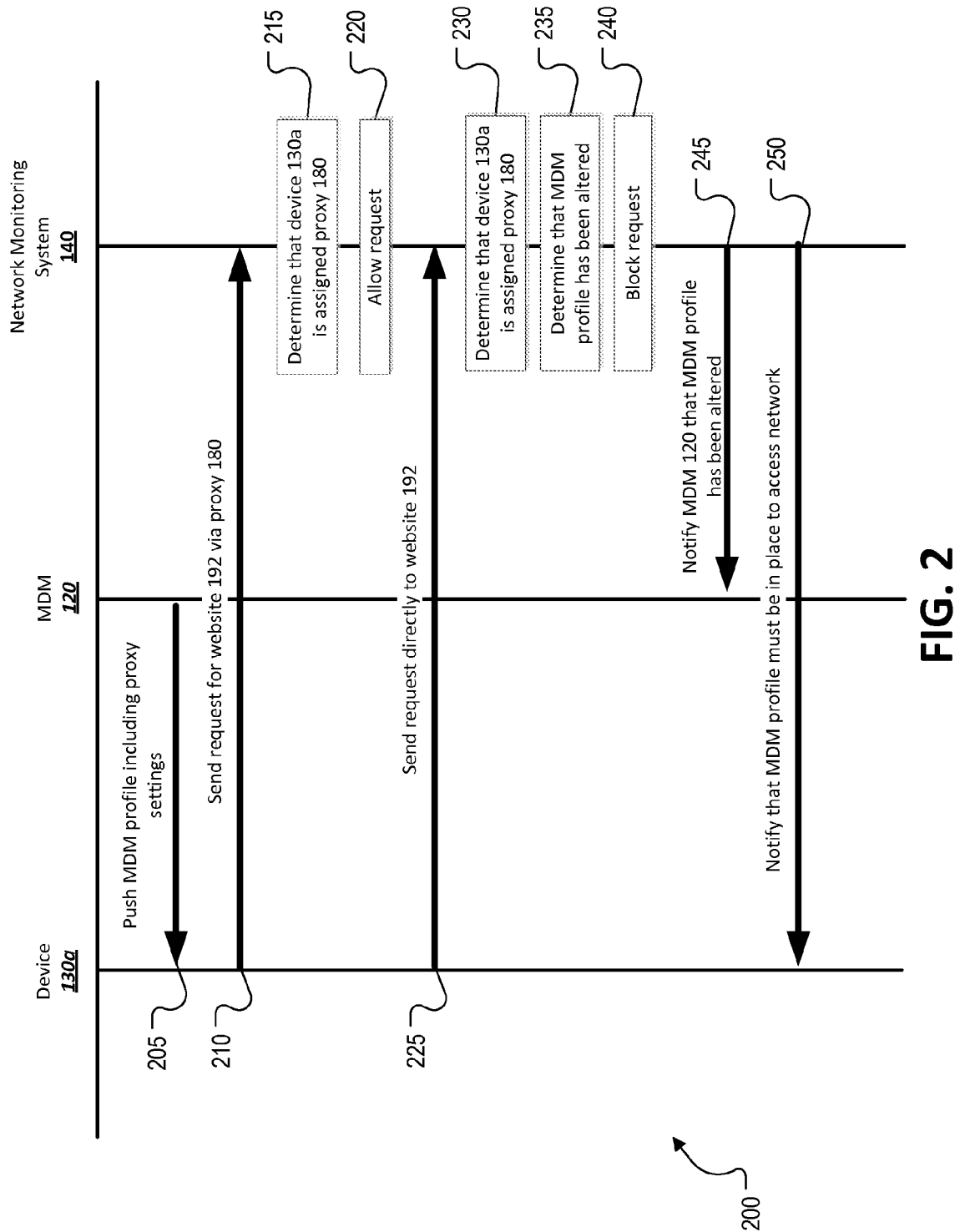
FIG. 2 is a message flow diagram of an example interaction between the components of the example network to detect profile changes based on device behavior.

FIG. 2 is a message flow diagram of an example interaction 200 between the components of the example network to detect profile changes based on device behavior.

At 205, the MDM 120 pushes an MDM profile including proxy settings to the device 130a. At 210, the device 130a sends a request for website 192 via the proxy server 180. The request is intercepted or monitored by the network monitoring system 140. In some implementations, the network monitoring system 140 receives the request. The network monitoring system 140 may also be notified of the request by another component, such as in a tap or span configuration.

At 215, the network monitoring system 140 determines that device 130a is assigned to proxy 180. In some cases, the network monitoring system 140 may consult the proxy assignments 152 in the database 150 to make this determination. At 220, the network monitoring system 140 allows the request. In some cases, the network monitoring system 140 may allow the request by taking no action at all, while in other configurations, the network monitoring system 140 may notify another network component to allow the request or forward the request on to its intended destination.

At 225, the device 130a sends a request directly to website 192. The network monitoring system 140 observes or intercepts this request as previously described. Again, at 230, the network monitoring system 140 determines that the device 130a is assigned to proxy 180. At 235, the network monitoring system 140 determines that the MDM profile associated with the device 130a has been altered. In some cases, the network monitoring system 140 may compare the address of the request sent at 225 to the address of the assigned proxy server for device 130a. If the two addresses do not match, the network monitoring system 140 may determine that the MDM profile on device 130a has been altered.

At 240, the network monitoring system 140 blocks the request sent by the device 130a. At 245, the network monitoring system 140 notifies the MDM 120 that the MDM profile on device 130a has been altered. At 250, the network monitoring system 140 notifies the device 130a that the MDM profile must be in place to access the network. In some implementations, the network monitoring system 140 may be configured to perform any combination of the actions shown at 240, 245, 250, and may be configured to perform any additional suitable action in response to determining that the MDM profile has been altered at 235.

Figure 3:
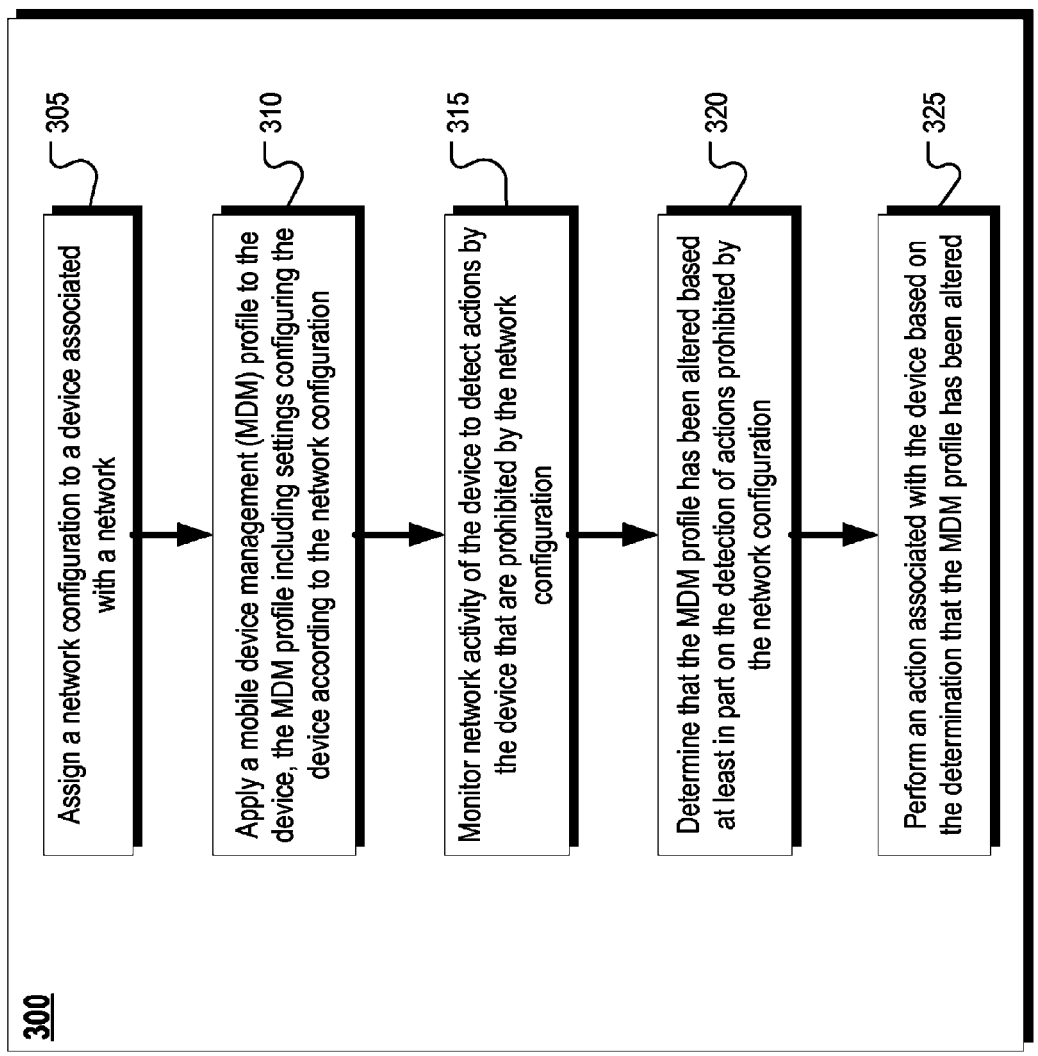
FIG. 3 is a flow chart of an example process of detecting profile changes based on device behavior.

FIG. 3 is a flow chart of an example process of detecting profile changes based on device behavior. At 305, a network configuration is assigned to a device associated with the network. In some implementations, the network configuration includes a proxy configuration associated with the device. In some cases, the network configuration may include a set of allowed servers that the device is allowed to access in addition to the at least one proxy server (e.g., proxy exceptions 154). At 310, an MDM profile is applied to the device. The MDM profile includes settings configuring the device according to the network configuration. In some implementations, the MDM profile is applied to the device by the MDM platform (e.g., 120).

At 315, network activity of the device is monitored to detect actions by the device that are prohibited by the network configuration. For example, if the network configuration specifies a proxy server that the device should access in order to access the Internet, a request sent by the device directly to an Internet address without using the proxy server may be determined to be an action by the devices prohibited by the network configuration.

At 320, a determination is made that the MDM profile has been altered based at least in part on the detection of actions prohibited by the network configuration. At 325, an action is performed associated with the device based on the determination at the MDM profile has been altered. In some implementations, the actions may include notifying administrator that the profiles been altered, restoring the MDM profile on the device, notifying the device that the MDM profile must be in place to access the network, or any other suitable action or combination of actions.

Figure 4:
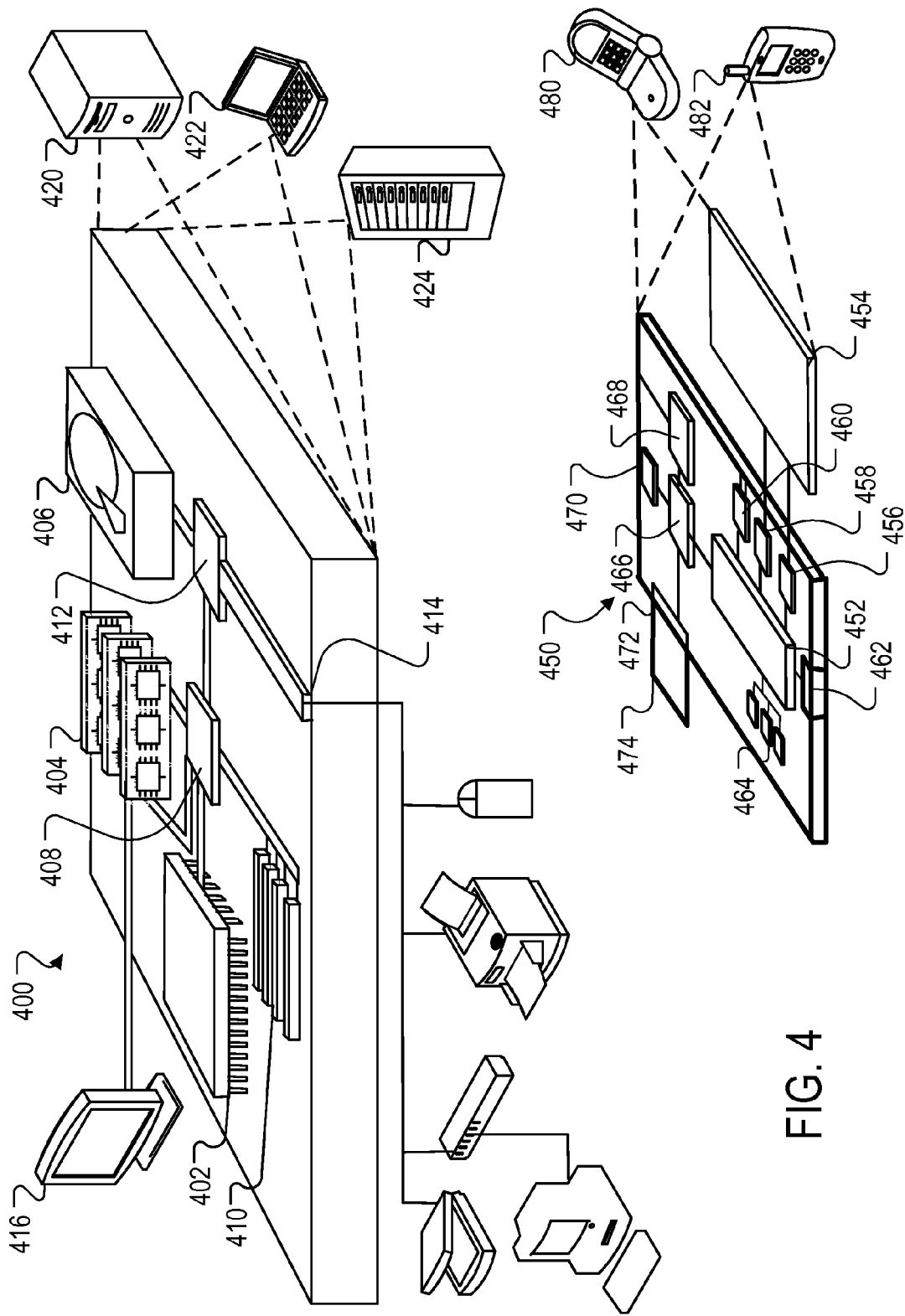
FIG. 4 is a diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:
assigning a network configuration to a device associated with a network;
applying a mobile device management (MDM) profile to the device, the MDM profile including settings configuring the device according to the network configuration;
monitoring network activity of the device to detect one or more actions by the device that are prohibited by the network configuration;
determining that the MDM profile has been altered based at least in part on the detection of one or more actions prohibited by the network configuration; and
performing a remediation action associated with the device based on the determination that the MDM profile has been altered.

2. The method of claim 1, wherein determining that the MDM profile has been altered includes determining that the MDM profile has been deleted.

3. The method of claim 1, wherein the network configuration includes at least one proxy server, and the one or more actions by the device that are prohibited by the network configuration include the device accessing servers other than the at least one proxy server.

4. The method of claim 3, wherein monitoring network activity of the device to detect the one or more actions by the device that are prohibited by the network configuration includes detecting access by the device to a server other than the at least one proxy server.

5. The method of claim 3, wherein the network configuration includes a set of allowed servers that the device is allowed to access in addition to the at least one proxy server.

6. The method of claim 1, wherein performing the remediation action associated with the device based on the determination that the MDM profile has been altered includes reapplying the MDM profile to the device.

7. The method of claim 1, wherein performing the remediation action associated with the device based on the determination that the MDM profile has been altered includes blocking access to the network by the device.

8. The method of claim 1, wherein performing the remediation action associated with the device based on the determination that the MDM profile has been altered includes notifying an administrator that the MDM profile has been altered.

9. The method of claim 1, wherein performing the remediation action associated with the device based on the determination that the MDM profile has been altered includes notifying a user of the device that the MDM profile must be restored in order for the device to use the network.

10. The method of claim 1, wherein applying a mobile device management (MDM) profile to the device includes installing a proxy auto-configuration (PAC) script on the device.

11. A system comprising:
a processor configured to execute computer program instructions; and
a computer storage medium encoded with computer program instructions that, when executed by the processor, cause the system to perform operations comprising:
assigning a network configuration to a device associated with a network;
applying a mobile device management (MDM) profile to the device, the MDM profile including settings configuring the device according to the network configuration;
monitoring network activity of the device to detect one or more actions by the device that are prohibited by the network configuration;

determining that the MDM profile has been altered based at least in part on the detection of one or more actions prohibited by the network configuration; and performing a remediation action associated with the device based on the determination that the MDM profile has been altered.

12. The system of claim 11, wherein determining that the MDM profile has been altered includes determining that the MDM profile has been deleted.

13. The system of claim 11, wherein the network configuration includes at least one proxy server, and the one or more actions by the device that are prohibited by the network configuration include the device accessing servers other than the at least one proxy server.

14. The system of claim 13, wherein monitoring network activity of the device to detect the one or more actions by the device that are prohibited by the network configuration includes detecting access by the device to a server other than the at least one proxy server.

15. The system of claim 13, wherein the network configuration includes a set of allowed servers that the device is allowed to access in addition to the at least one proxy server.

16. The system of claim 11, wherein performing the remediation action associated with the device based on the determination that the MDM profile has been altered includes reapplying the MDM profile to the device.

17. The system of claim 11, wherein performing the remediation action associated with the device based on the determination that the MDM profile has been altered includes blocking access to the network by the device.

18. The system of claim 11, wherein performing the remediation action associated with the device based on the determination that the MDM profile has been altered includes notifying an administrator that the MDM profile has been altered.

19. The system of claim 11, wherein performing the remediation action associated with the device based on the determination that the MDM profile has been altered includes notifying a user of the device that the MDM profile must be restored in order for the device to use the network.

20. The system of claim 11, wherein applying a mobile device management (MDM) profile to the device includes installing a proxy auto-configuration (PAC) script on the device.

\* \* \* \* \*